United States Patent Office 2,786,822
Patented Mar. 26, 1957

2,786,822

PIGMENTED VINYLIDENE PLASTICS AND METHOD FOR PREPARING THE SAME

Vincent C. Vesce, Smoke Rise, Kinnelon, N. J., assignor to The B. F. Goodrich Company, New York, N. Y., a corporation of New York No Drawing. Application June 2, 1953,
Serial No. 359,221

14 Claims. (Cl. 260—41)

This invention relates to pigmented compositions and more particularly relates to the production of pigmented compositions of matter suitable for the coloring of plastics generally and specifically in the present application to the pigmentation of one of the classes of plastics, namely, vinylidene resin plastics, disclosed in my prior application Serial No. 108,423, filed August 3, 1949, now U. S. Patent 2,649,382, of which this present application is a continuation-in-part.

The production of plastic masses containing dispersed pigment for incorporation into large batches for coloring purposes is not broadly new. Such dispersions are known in the industry as "color master batches." In the production of vinylidene resin plastic color master batches heretofore it has been necessary to submit pigment and plastic to prolonged and expensive mechanical working in equipment capable of exerting high shearing stresses in order to achieve a dispersion of pigment in plastic of moderately satisfactory quality. In such prior operations, the milling times are considerable, the power requirements for such equipment very high, the constant attendance of skilled labor is required, and the degree of dispersion obtained leaves much to be desired when a very fine degree of dispersion is required.

I have discovered that vinylidene resin plastic color master batches of extremely high quanlity can be prepared in an efficient manner with simple inexpensive milling of pigment and vinylidene resin plastic by the use of a novel and special type of liquid grinding medium, which later can be easily removed from the milled batch, and even reused, if desired, for new batches. After the removal of the liquid grinding medium from the milled batch, the dispersed pigment-in-plastic solids are dried, the dried vinylidene resin plastic master color batch being normally in a free-flowing particulate form, which is soft in texture and can be easily reduced to a very fine powdery consistency.

The vinylidene resin plastic master color batches produced in the novel process above recited are stable, uniform and free from agglomerates, have a high chromaticity, and, when used to color plastic masses, make available the full strength of the pigment employed.

One object of this invention is the production of a vinylidene resin plastic master color batch, which requires only simple, inexpensive milling in its preparation. Another object is the production of a pigmented vinylidene resin plastic containing solid pigment in a state of extremely fine and uniform dispersion and having a high chromaticity. Still another object is the production of a uniformly fine dispersion of solid pigment in vinylidene resin plastic in the form of a dry, free-flowing powder which is easily incorporated into a mass of the same or similar plastic to give a uniformly colored plastic mass capable of being spun, extruded, molded or treated in any of the many ways known to those skilled in the art of utilizing such pigmented vinylidene resin plastics for the production of uniformly and strongly colored yarns, filaments, films, lacquers, paints, enamels, and other products.

Further objects of this invention will be apparent from the detailed specifications which follow.

In practicing the invention of this application, I place in a ball, pebble or other colloidal mill a mixture consisting essentially of the vinylidene resin plastic to be pigmented, the specific pigment, and the novel liquid grinding medium comprising water and a liquid organic solvent for the vinylidene resin plastic to be pigmented characterized additionally by its water-miscibility. Both the plastic and the pigment may be in particulate form. The organic solvent and water are present in the novel liquid grinding medium in such proportions that the liquid grinding medium does not dissolve a substantial amount of the plastic and does not cause substantial agglomeration of the plastic. The balls or pebbles or other solid grinding elements are added to the mixture of plastic, pigment and liquid grinding medium, the mill closed and allowed to grind the mixture, without necessity for any attendant, until a dispersion of pigment in plastic of the desired degree is obtained.

The vinylidene resin plastics which are embodied in the specification as illustrative of the invention of this application are vinylidene resin plastics of normally solid structure, substantially insoluble in water and at least partially soluble in an organic solvent which is miscible with water. Such a plastic is hereinafter in this specification and in the appended claims termed a "vinyl resin plastic." Many vinylidene resin plastics, but by no means all such vinylidene resin plastics, are enumerated and classified in volume 5, chapter 1 of "Protective and Decorative Coatings," edited by Joseph J. Mattiello, Ph. D., and published in 1946 by John Wiley & Sons, Inc., of New York.

On page 4 and pages 44 through 49, of the above-identified publication, Mattiello enumerates the types of vinylidene compounds which come within the term "vinylidene resin plastic" as herein employed as including the polyalkanes, such as the polymers of ethylene and of isobutene; the halogenated polyalkanes and polyalkenes, such as the polymers of vinyl chloride, of vinylidene chloride and of chloroprene; the polyarylenes, such as the polymers of styrene; the vinylidene resin plastics containing oxygen, such as the polymers of vinyl acetate, of vinyl acetal, of the acrylates, the methacrylates and methyl methacrylates; and copolymers of vinylidene compounds. The vinylidene resin plastics hereinabove listed, which were incorporated by reference in the aforementioned parent application, Serial No. 108,423, are recited in this specification as including some of the vinylidene resin plastics suitable for the purpose of this invention.

It is apparent from an examination of the polyvinylidene compounds recited in the preceding paragraph that the vinylidene resin plastics of this application are the polymerization products of monomers having the general formula

herein referred to as "vinylidene monomers" as well as the copolymerization products of such vinylidene monomers with other monomers of the same type and/or with other organic compounds.

By way of illustration only of the vinylidene monomers embraced by the above indicated formula and of the vinylidene resin polymers thereof, the following examples are given:

(a) Where $R_1$ and $R_2$ represent the same element or radical, if each $R_1$ and $R_2$ is hydrogen, then the monomer is ethylene and the vinylidene resin plastic is polyethylene; if each $R_1$ and $R_2$ is chlorine, then the monomer is vinylidene chloride and the vinylidene resin plastic is polyvinylidene chloride known in the trade as Saran; if each $R_1$ and $R_2$ is a methyl radical, then the monomer is isobutylene and the vinylidene resin plastic is polyisobutylene, known in the trade as Vistenex;

(b) Where $R_1$ represents a hydrogen atom and $R_2$ represents another element or a radical, if $R_2$ is a chlorine atom, then the monomer is vinyl chloride and the vinylidene resin plastic is polyvinyl chloride, known in the trade as Geon; if $R_2$ is an acetate radical, then the monomer is vinyl acetate and the vinylidene resin plastic is polyvinyl acetate; if $R_2$ is a phenyl radical, then the monomer is styrene and the vinylidene resin plastic is polystyrene, known in the trade as Lustron; if $R_2$ is a CN radical, then the monomer is acrylonitrile and the vinylidene resin plastic is polyacrylonitrile, known in the trade as Orlon; if $R_2$ is a $COOCH_3$ radical, then the monomer is methyl acrylate and the vinylidene resin plastic is polymethyl acrylate, known in the trade as Acryloid; if $R_2$ is a carbazole radical, then the monomer is vinyl carbazole and the vinylidene resin plastic is polyvinyl carbazole, known in the trade as Polectron.

(c) Where $R_1$ and $R_2$ represent different radicals, if $R_1$ is a $CH_3$ radical and $R_2$ a $COOCH_3$ radical, then the monomer is methyl methacrylate and the vinylidene resin plastic is polymethyl methacrylate, known in the trade as Plexiglas and Lucite.

Further, the vinylidene resin plastics of this invention may be produced by the copolymerization of any two of the monomers of the above indicated general formula, thus, copolymerization of vinyl chloride and vinylidene chloride produces a vinylidene resin plastic known in the trade as Geon; copolymerization of vinyl chloride and vinyl acetate produces a vinylidene resin plastic known in the trade as Vinylite and Tygon; copolymerization of vinyl chloride and acrylonitrile produces a vinylidene resin plastic known in the trade as Dynel or Vinyon N; copolymerization of acrylonitrile and vinyl acetate produces a vinylidene resin plastic known in the trade as Acrilan; copolymerization of vinylidene chloride and acrylonitrile produces a vinylidene resin plastic known in the trade as Saran.

It is to be understood that the above enumerated polymers and copolymers are given by way of illustration only of the class of vinyl compounds comprehended within the term "vinylidene resin plastic" as that term is defined hereinabove and is employed in this specification and in the appended claims.

As pigment, one may employ any of the solid colorants normally used in the industry for the coloring, opacifying, delustering or otherwise modifying the color of the vinylidene resin plastics. These include the inorganic prime pigments, organic prime pigments, various inert or extender pigments, metallic pigments and the various finely divided carbon blacks, including bone and gas blacks, such as disclosed in Mattiello "Protective and Decorative Coatings," volume 2, chapter 1 (1942), or the Journal of the Society of Dyers and Colorists, volume 61 (307), December 1945.

As an essential feature of the invention, the vinylidene resin plastic and pigment are mixed with a liquid grinding medium comprising water and a liquid organic water-miscible solvent for the plastic employed. It is important that the mixture of water and solvent be present in such proportions in the liquid grinding medium that, during the time of processing, the mixture of liquid organic solvent and water does not substantially dissolve the vinylidene resin plastic or substantially cause it to gell or agglomerate.

To accurately find the point at which the liquid organic solvent and water liquid grinding medium becomes substantially a non-solvent for the vinylidene resin plastic, a series of test specimens are made up comprising the selected solvent with various percentages of water. Such solutions may vary in 5% or 10% increments depending upon the precision desired. Thus, as an example, one may fill a number of oil bottles with water-solvent solutions varying from 10% to 90% water by weight, as by increments of 5% or 10%. A small amount of the vinylidene resin plastic is then added to each bottle, preferably in the physical form in which it is to be used and in an amount of about 1 part of vinylidene resin plastic to 4 parts of liquid medium. The mixture is well agitated and the vinylidene resin plastic is then permitted to settle.

One may note that in one or more of the bottles the vinylidene resin plastic either goes completely into solution or clumps or agglomerates into a more or less translucent, gell-like mass. It will also be noted that in the remaining bottles, the plastic retains a discrete particle appearance. While these effects can generally be observed almost immediately, it is better to permit about 4 hours of contact before comparisons are made and still more preferably one may allow as much time for contact as is to be given during the actual pigment dispersion operation.

The action of the mixture of water and liquid organic solvent on the vinylidene resin plastic when it is less drastic than that which causes a gelling and agglomeration of the vinylidene resin plastic and yet contains sufficient solvent to make the vinylidene resin plastic receptive to pigment dispersion can best be termed a "pigment receptive action" on the plastic.

The most desirable and optimum water-organic solvent liquid grinding medium has been found to be the one having that proportion of water just sufficient to prevent the above-mentioned extensive solvent action, and yet have enough solvent present to attack the vinylidene resin plastic and make it receptive to the entrance and dispersion of pigment. It should be clearly understood, however, that for operability there is no precise percentage of solvent in water or precise point where the liquid medium imparts the receptive quality to the vinylidene resin plastic but, rather, a range which may vary from about 2 or 3 percent—in the case of particular solvents and particular vinylidene resin plastics—to as much as about 90% with other solvents and vinylidene resin plastics. The indication that the amount of solvent is "approximately" below that which results in gelling or agglomeration is intended to cover that range where the pigment receptive action on the vinylidene resin plastic takes place.

The amount of liquid grinding medium comprising liquid organic solvent and water, used in the process, is selected by the operator to be sufficient to give fluidity to the solids in the particular mill used in the process. A mill with Flint pebbles, for example, will generally require more liquid grinding medium than one using steel balls. It is, of course, obvious that one may, if so desired, use other types of mills for the grinding operation.

Such liquid organic water-miscible solvents which will solubilize the vinylidene resin plastics include the alcohols, as, for example, methyl, ethyl, iso-propyl alcohol, diacetone alcohol, etc.; dioxane; the glycol ethers as, for example, the Cellosolves and the Carbitols; the esters such as the Cellosolve acetates and methyl or ethyl lactate; the ketones such as acetone, methyl-ethyl ketone; and other solvents or mixture of solvents for the vinylidene resin plastics well known to the art.

For a better understanding of the invention, the following examples are given, it being clearly understood that these are merely by way of illustration and not to be considered limitative of the invention. References to the pigments employed utilize the generally accepted trade name. The letter "M" with figure and page number following the name refers to the figures and pages in volume 5 of J. J. Mattiello's "Protective and Decorative Coatings" which gives the chemical composition.

The designation "C. I." refers to the well-known colour index published by the Society of Dyers and Colorists.

Unless otherwise noted, all percentages are to be considered as being on a weight basis.

*Example 1*

A one-gallon porcelain pebble mill is charged with 1400 grams of a liquid grinding medium consisting of 50% dioxane and 50% water. To this mixture is added 200 grams of a vinylidene resin plastic produced by the polymerization of styrene, such as polystyrene produced by the Bakelite Corporation, and 200 grams of methyl amino anthraquinone (Indo Red RV 20). About 7 lbs. of #00 French flint pebbles are added. After milling for about 45 hours, the mill is discharged and rinsed out with water. The product and rinse water are collected and filtered. The filter cake is then washed, dried and pulverized. One obtains 398 grams of a plastic color master batch in the form of a fine bright red powder which is an excellent dispersion of the coloring matter in the polystyrene vinylidene resin plastic.

In the above example, for the methyl amino anthraquinone pigment was substituted 100 grams of Carbethoxy Pyrazolone Red Toner (M: Fig. 81, page 407), and for the liquid grinding medium was substituted one consisting of 50% acetone and 50% water. After processing as indicated above, one obtains a fine soft-textured red powder. Similarly other pigments may be employed, such as Lithosol Red 2B Manganese Toner (M: Fig. 90, page 412), Toluidine Maroon Powder (M: Fig. 83, page 408), Phthalocyanine Green (M: Fig. 144, page 439), Benzidene Yellow Toner (M: Fig. 48, page 391), titanium dioxide, carbon black, and the like. Again, other liquid grinding media may be substituted within the scope of this inventon to produce a plastc color master batch of excellent quality, and may be composed of water and any one, or combination, of the organic solvents listed above as suitable for the purposes of this invention, in such proportions as the preliminary test procedure described above may indicate.

*Example 2*

A one-gallon porcelain pebble mill is charged with 200 grams of Indanthrene Blue (C. I. 1113) and 1200 grams of a liquid grinding medium consisting of 50% acetone and 50% water. To this mixture is added 400 grams of a vinylidene resin plastic produced by the copolymerization of vinyl chloride and vinyl acetate (vinylite VYHH). About 7 lbs. of #00 French flint pebbles are added. After milling for about 70 hours, the mill is discharged and rinsed out with water. The product and wash liquid are collected and filtered. The filter cake is then washed, dried and pulverized. One obtains around 600 grams of a plastic color master batch in the form of a soft-textured blue powder which dissolves easily into methyl isobutyl ketone to produce an excellent dispersion.

Other copolymers of the vinylidene monomers are also capable by the processes of this invention to be incorporated into plastic color master batches. Thus, the following have been embodied in commercial plastic color master batches: the copolymer of vinylidene chloride and vinyl chloride, produced by Dow Chemical Company and marketed under the trade name Saran; the copolymer of vinyl chloride and acrylonitrile, produced by Union Carbide & Carbon Corporation, and marketed under the trade name Dynel; and the copolymer of acrylonitrile and vinyl acetate produced by Chemstrand Corporation, and marketed under the trade name Acrilan. Other pigments and other liquid grinding media, such as are disclosed in connection with Example 1 may be employed.

*Example 3*

A one-gallon porcelain pebble mill is charged with 160 grams of Pyrazolone Red Toner (M: Fig. 71, page 402) and 880 grams of a liquid grinding medium consisting of 80% dioxane and 20% water. This is mixed well and to the mixture is added 240 grams of polymerized vinyl chloride powder, such as produced by B. F. Goodrich under the trade name Geon #101. About 20 lbs. of steel balls, averaging ½" in diameter, are added. After milling for about 45 hours, the mill is discharged and rinsed with water. The product and wash liquid are collected and filtered. The filter cake is then washed, dried and pulverized. One obtains about 400 grams of a plastic color master batch in the form of a bright, soft-textured red powder which is a good dispersion as judged by the fineness of its solution in straight dioxane.

In any of the above Examples 1, 2 and 3, Turkey Red oil, in amounts of from 20 to 40 grams, may be added to the liquid grinding medium to facilitate the filtration and produce a softer color. The Turkey Red oil is a sulfonated oil, is a water-soluble product, and is eliminated in major part during the washing and filtration steps.

Other pigments and other liquid grinding media may be employed, as explained more fully in connection with Example 1.

*Example 4*

A one-gallon porcelain pebble mill is charged with 75 grams of Carbethoxy Pyrazolone Red Toner (M: Fig. 81, page 407), 600 grams of dioxane and 600 grams of water, resulting in a liquid grinding medium of 50% dioxane and 50% water. This is mixed well and to the mixture is added 675 grams of a vinylidene resin plastic consisting of polymerized vinylidene chloride, such as produced by the Dow Chemical Company and sold under the trade name Saran B115. About 7 lbs. of #00 French flint pebbles are added. After milling for about 70 hours, the mill is discharged and rinsed out with water. The product and the wash liquid are collected and filtered. The filter cake is washed, dried and pulverized. One obtains 740 grams of a plastic color master batch in the form of a fine soft dry powder characterized by extreme intensity of color indicating a uniformly high degree of dispersion of pigment in the vinylidene resin plastic.

Other pigments may be substituted for the Red Toner, and other solvents may be utilized in the liquid grinding medium with excellent results.

*Example 5*

A one-gallon porcelain pebble mill is charged with 100 grams of titanium dioxide, Anatase type and 1500 grams of a liquid grinding medium consisting of 32% acetone and 68% water. This is well mixed and to the mixture is added 200 grams of polymethyl methacrylate powder, such as Plexiglas A–100 produced by Rohm & Haas. About 7 lbs. of #00 French flint pebbles are added. After milling for about 45 hours, the mill is discharged and rinsed out with water. The product and wash liquid are collected and filtered. The filter cake is then washed, dried and pulverized. One obtains 300 grams of a plastic color master batch in the form of a white granular mass which can be readily pulverized for molding purposes.

In the above example, polyacrylonitrile, such as Orlon produced by Du Pont, may be substituted for the polymethyl methacrylate, to produce plastic color master batches of excellent quality. In place of titanium dioxide, a high-grade carbon black, i. e., a fine particle size carbon black, with either polymethyl methacrylate or polyacrylonitrile, yields an excellent quality plastic color master batch. It will be understood that other pigments may also be employed in the process of this example with very satisfactory results.

In making the substitutions of plastics and/or pigments indicated in connection with the above examples, it is to be understood that the optimum proportions of the constituents of the liquid grinding medium need to be determined in each case by carrying out the test procedure hereinbefore disclosed.

*Example 6*

A one-gallon porcelain pebble mill is charged with 108 grams of the beta modification of copper phthalocyanine, such as is marketed under the trade name Phthalocyanine Blue B-4790, and 1500 grams of a liquid grinding medium containing 60% acetone and 40% water. This is well mixed and to the mixture is added 216 grams of the copolymerization product of acrylonitrile (85%) and vinyl acetate (15%), marketed by the Chemstrand Corporation under the trade name Acrilan. About 7 lbs. of #00 French flint pebbles are added. After milling for about 16 hours, the mill is discharged and rinsed out with water. The product and wash liquid are collected and filtered. The filter cake is then washed, dried and pulverized. One obtains about 315 grams of a fine soft-textured bright blue powder of high tinctorial value.

*Example 7*

A one-gallon porcelain pebble mill is charged with 160 grams Rincon Red R-6160 (M: Fig. 91, page 412) and 1520 grams of a liquid grinding medium containing 88% acetone and 12% water. This is well mixed and to the mixture is added 160 grams of the copolymerization product of vinyl chloride (60%) and acrylonitrile (40%), such as is marketed by Union Carbide & Carbon Corporation under the trade name Vinyon N. About 7 lbs. of #00 French flint pebbles are added. After milling for about 16 hours, the mill is discharged and rinsed out with water. The product and the rinse water are collected and filtered. The filter cake is then washed, dried and pulverized. One obtains about 315 grams of a bright red soft-textured powder characterized by high intensity of color indicating a uniformly high degree of dispersion in the vinylidene resin plastic.

*Example 8*

A one-gallon porcelain pebble mill is charged with 100 grams of titanium dioxide, Anatase brand, and 1490 grams of a liquid grinding medium containing 1152 grams acetone, 298 grams water and 40 grams acetic acid, the latter being employed as a buffering or neutralizing agent for the alkaline titanium dioxide. This is mixed well and to the mixture is added 200 grams of the copolymerization product of vinyl chloride and acrylonitrile, such as is marketed under the trade name Dynel. About 7 lbs. of #00 French flint pebbles are added. After milling about 16 hours, the mill is discharged and rinsed with water. The product and wash liquid are collected and filtered. The filter cake is then washed, dried and pulverized. One obtains about 297 grams of a fine white soft-textured powder of high tinctorial value.

It is in some cases advantageous, as in Example 8 above, to use additional materials in the milling operation to overcome certain difficulties inherent in the solids being milled, whether in the vinylidene resin plastic or in the pigment. Thus, where the solids are acid or alkaline to such extent that the acidity or alkalinity, as the case may be, might adversely affect the quality of the final product, or might seriously corrode the milling equipment, one may overcome this difficulty by adding suitable buffering or neutralizing agents which are water soluble and thus capable of being in major part removed during the washing operations. Similarly, it is sometimes desirable to add in minor proportions water-soluble wetting agents or other materials to improve or modify the color of the final product just as is done in the manufacture of dry color. Thus, one may add Turkey Red oil, metallic soaps or other water-soluble pigment modifying agents to the liquid grinding medium during the grinding operation.

It will be noted from the above examples that with regard to the percentage of constituents in the liquid grinding medium, one may use from as little as approximately 10% to as much as about 90% by weight, depending upon the liquid organic solvent selected and the particular vinylidene resin plastic to be pigmented. By the test procedure described earlier, one selects the proper ratio of water to liquid organic solvent that yields in the particular process optimum results.

As indicated hereinbefore, the amount of liquid grinding medium employed in the process is selected to provide a consistency suitable for optimum milling operation. As can be seen, wide variations in the amount of liquid used is possible, depending upon the amount of solids to be milled, the type of milling employed and the types of vinylidene resin plastics and pigment to be blended into a plastic color master batch.

The amount of pigment used in the process, and therefore present in the final plastic color master batch, may vary from as little as about 1% to as high as approximately 95% by weight, depending on the end use. For most purposes as a vinylidene resin plastic color master batch, a range of approximately 30% to 70% pigment by weight to the total weight of the color master batch is preferred.

It is here pointed out that one may by the process of this invention make pigmented vinylidene resin plastic color batches with a mixture of pigments, in lieu of the single pigment of the above examples, and/or with a mixture of vinyl resin plastics rather than a single vinylidene resin plastic, in order to obtain desired properties in the pigmented vinylidene resin plastic color master batch not obtainable with a single pigment and/or with a single vinylidene resin plastic.

The terms "color value" and "chromaticity" as used hereinabove and in the claims, are terms well known in the art and are employed substantially as described and discussed in "Handbook of Colorimetry" by A. C. Hardy, published by the Technology Press.

What is claimed is:

1. A process of dispersing pigment in a vinylidene resin plastic which comprises milling pigment and vinylidene resin plastic in a liquid grinding medium comprising water and a liquid organic water-miscible solvent in which the vinylidene resin plastic is at least partially soluble, the water and solvent being present throughout the milling operation in such proportions that the liquid grinding medium does not dissolve a substantial amount of the vinylidene resin plastic and does not cause substantial agglomeration of the vinylidene resin plastic, the liquid grinding medium being present at all times in such amounts as to give a fluidity to the mixture which permits effective milling action, continuing the milling action until a dispersion of pigment in vinylidene resin plastic is obtained, and thereafter separating the solid portion from the liquid portion of the milled mixture.

2. The process of claim 1 wherein pigment and vinylidene resin plastic are each admixed with the liquid grinding medium in particulate form so that the vinylidene resin plastic particles are caused to become pigment-receptive by action of the liquid grinding medium thereon and the milling action produces impinging contact of pigment particles with pigment-receptive vinylidene resin plastic particles.

3. The process of claim 1 wherein the vinylidene resin plastic is essentially a polymerization product selected from a class consisting of polymers of ethylene, styrene, vinyl chloride, vinylidene chloride, vinyl acetate, vinyl carbazole, acrylonitrile, methylacrylate, methyl methacrylate and isobutylene.

4. A vinylidene resin plastic color master batch produced by the process of claim 1 wherein the amount of pigment is within a range of 30% to 70% of the total weight of the color master batch.

5. A vinylidene resin plastic color master batch consisting essentially of pigmented vinylidene resin plastic in the form of dry free-flowing particles possessing a chromaticity not substantially less than the pigment portion thereof, said particles being readily dispersible in a solvent for the vinylidene resin plastic to yield a colloidal dispersion of pigment in a solution of the vinylidene resin plastic.

6. A process of dispersing pigment in a vinylidene resin plastic which is essentially a polymerization product selected from a class consisting of polymers of ethylene, styrene, vinyl chloride, vinyl acetate, vinyl carbazole, vinylidene chloride, acrylonitrile, methylacrylate, methyl methacrylate and isobutylene, which comprises milling pigment and vinylidene resin plastic in a liquid grinding medium comprising water and a liquid organic water-miscible solvent in which the vinylidene resin plastic is at least partially soluble, the water and solvent being present throughout the milling operation in such proportions that the liquid grinding medium does not dissolve a substantial amount of the vinylidene resin plastic and does not cause substantial agglomeration of the vinylidene resin plastic, the liquid grinding medium being present at all times in such amounts as to give a fluidity to the mixture which permits effective milling action, continuing the milling action until a dispersion of pigment in vinylidene resin plastic is obtained, and thereafter separating the solid portion from the liquid portion of the milled mixture.

7. The process of making a vinylidene resin plastic master color batch which comprises milling pigment and vinylidene resin plastic in a liquid grinding medium comprising water and a liquid organic water-miscible solvent in which the vinylidene resin plastic is at least partially soluble, the water and solvent being present in the liquid grinding medium in such proportions that it does not dissolve a substantial amount of the vinylidene resin plastic and does not cause substantial agglomeration of the vinylidene resin plastic, the liquid grinding medium being present in such amounts as to give a fluidity to the mixture which permits effective milling action, continuing the milling action until a vinylidene resin plastic master color batch is obtained, and thereafter filtering the milled mixture, washing the solid portion thereof with water and then drying the solids to produce a vinylidene resin plastic master color batch.

8. The process of claim 7 wherein the vinylidene resin plastic is a polymerization product selected from a class consisting of polymers of ethylene, styrene, vinyl chloride, vinyl acetate, vinyl carbazole, vinylidene chloride, acrylonitrile, methylacrylate, methyl methacrylate, and isobutylene.

9. A vinylidene resin plastic color master batch produced by the process of claim 7 wherein the amount of pigment is within a range of 30% to 70% of the total weight of the color master batch.

10. The process of making a vinylidene resin plastic master color batch which comprises milling pigment and a polymer of vinyl chloride in a liquid grinding medium comprising water and a liquid organic water-miscible solvent in which the polymer of vinyl chloride is at least partially soluble, the water and solvent being present in the liquid grinding medium in such proportions that it does not dissolve a substantial amount of the polymer of vinyl chloride and does not cause substantial agglomeration of the polymer of vinyl chloride, the liquid grinding medium being present in such amounts as to give a fluidity to the mixture which permits effective milling action, continuing the milling action until a master color batch is obtained, and thereafter filtering the milled mixture, washing the solid portion thereof with water, and then drying the solids to produce a master color batch.

11. The process of making a vinylidene resin plastic master color batch which comprises milling pigment and a polymer of acrylonitrile in a liquid grinding medium comprising water and a liquid organic water-miscible solvent in which the polymer of acrylonitrile is at least partially soluble, the water and solvent being present in the liquid grinding medium in such proportions that it does not dissolve a substantial amount of the polymer of acrylonitrile and does not cause substantial agglomeration of the polymer of acrylonitrile, the liquid grinding medium being present in such amounts as to give a fluidity to the mixture which permits effective milling action, continuing the milling action until a master color batch is obtained, and thereafter filtering the milled mixture, washing the solid portion thereof with water, and then drying the solids to produce a master color batch.

12. The process of making a vinylidene resin plastic master color batch which comprises milling pigment and a copolymer of vinyl chloride and vinyl acetate in a liquid grinding medium comprising water and a liquid organic water-miscible solvent in which the copolymer of vinyl chloride and vinyl acetate is at least partially soluble, the water and solvent being present in the liquid grinding medium in such proportions that it does not dissolve a substantial amount of the copolymer of vinyl chloride and vinyl acetate and does not cause substantial agglomeration of the copolymer of vinyl chloride and vinyl acetate, the liquid grinding medium being present in such amounts as to give a fluidity to the mixture which permits effective milling action, continuing the milling action until a master color batch is obtained, and thereafter filtering the milled mixture, washing the solid portion thereof with water, and then drying the solids to produce a master color batch.

13. The process of making a vinylidene resin plastic master color batch which comprises milling pigment and a copolymer of vinyl chloride and acrylonitrile in a liquid grinding medium comprising water and a liquid organic water-miscible solvent in which the copolymer of vinyl chloride and acrylonitrile is at least partially soluble, the water and solvent being present in the liquid grinding medium in such proportions that it does not dissolve a substantial amount of the copolymer of vinyl chloride and acrylonitrile and does not cause substantial agglomeration of the copolymer of vinyl chloride and acrylonitrile, the liquid grinding medium being present in such amounts as to give a fluidity to the mixture which permits effective milling action, continuing the milling action until a master color batch is obtained, and thereafter filtering the milled mixture, washing the solid portion thereof with water, and then drying the solids to produce a master color batch.

14. The process of making a vinylidene resin plastic master color batch which comprises milling pigment and a copolymer of vinyl acetate and acrylonitrile in a liquid grinding medium comprising water and a liquid organic water-miscible solvent in which the copolymer of vinyl acetate and acrylonitrile is at least partially soluble, the water and solvent being present in the liquid grinding medium in such proportions that it does not dissolve a substantial amount of the copolymer of vinyl acetate and acrylonitrile and does not cause substantial agglomeration of the copolymer of vinyl acetate and acrylonitrile, the liquid grinding medium being present in such amounts as to give a fluidity to the mixture which permits effective milling action, continuing the milling action until a master color batch is obtained, and thereafter filtering the milled mixture, washing the solid portion thereof with water, and then drying the solids to produce a master color batch.

References Cited in the file of this patent
UNITED STATES PATENTS 2,379,237   Jenkins _____ June 26, 1945

OTHER REFERENCES

Hackh's Chemical Dictionary, 3rd ed. Grant page 895, published 1944 by the Blakiston Company, Philadelphia, Pa.